(12) United States Patent
Huang et al.

(10) Patent No.: US 7,375,817 B2
(45) Date of Patent: May 20, 2008

(54) COUNTING SIGNAL PROCESSING METHOD FOR FIBER OPTIC INTERFEROMETRIC SENSOR

(75) Inventors: Shih-Chu Huang, Kaohsiung (TW); Hermann Lin, Kaohsiung (TW); Heng-Shan Hsu, Kaohsiung (TW); Chun-Long Chang, Kaohsiung (TW); Jiunn-Song Tsay, Kaohsiung County (TW)

(73) Assignee: Shin-Chu Huang, Kaohsiung (TW)

( * ) Notice: Subject to any disclaimer, the term of this patent is extended or adjusted under 35 U.S.C. 154(b) by 198 days.

(21) Appl. No.: 11/308,844

(22) Filed: May 15, 2006

(65) Prior Publication Data

US 2007/0263225 A1 Nov. 15, 2007

(51) Int. Cl.
G01B 9/02 (2006.01)
G02B 6/00 (2006.01)

(52) U.S. Cl. .......................... 356/477; 385/12
(58) Field of Classification Search ................ 356/477, 356/478; 385/12
See application file for complete search history.

(56) References Cited

U.S. PATENT DOCUMENTS 5,012,088 A * 4/1991 Cole et al. ............. 250/227.19
2007/0280693 A1* 12/2007 Meyer ......................... 398/79

OTHER PUBLICATIONS

"Elimination of drift in a single-mode optical fiber interferometer using a piezoelectrically stretched coiled fiber" submitted by Jackson et al., Applied Optics/ vol. 19, No. 17 / Sep. 1, 1980, pp. 2926-2929.
"Homodyne Demodulation Scheme for Fiber Optics Sensors Using Phase Generated Carrier" submitted by Dandridge et al., IEEE Journal of Quantum Electronics, vol. QE-18, No. 10, Oct. 1982, pp. 1647-1653.
"Polarisation-Insensitive Fibre Optic Michelson Interferometer" submitted by Kersey et al., Electronic Letters Mar. 14, 1991 vol. 27 No. 6, pp. 518-520.

* cited by examiner

*Primary Examiner*—Patrick Connolly
(74) *Attorney, Agent, or Firm*—Jianq Chyun IP Office

(57) ABSTRACT

A counting signal processing method for a fiber optic interferometric sensor including following steps is provided. An output intensity of the fiber optical interferometric sensor is converted into an electrical signal having the form $V_0 + V_1 \cos \psi(t)$. Then, the number of times N1 that the maximum peak values are greater than a first counting level S1 and the number of times N2 that the minimum peak values are smaller than a second counting level S2 within a specific period of time $T_C$ are counted. When the value of N1, N2 or (N1+N2) is greater than a threshold counting number $C_{th}$, a detectable induced signal occurring in a sensing area is inferred. Then, whether the detectable induced signals are caused by an intruder or otherwise is judged through an alarm identification logic, and an alarm device is triggered to send out an alarm according to the result of the judgment.

15 Claims, 6 Drawing Sheets

COUNTING SIGNAL PROCESSING METHOD FOR FIBER OPTIC INTERFEROMETRIC SENSOR

BACKGROUND OF THE INVENTION

1. Field of the Invention

The present invention relates to a signal processing method for a fiber optic interferometric sensor. More particularly, the present invention relates to a counting signal processing method for a fiber optic interferometric sensor.

2. Description of the Related Art

Single mode fiber optic interferometric sensors such as the Mach-Zehnder interferometers, the Sagnac interferometers and the Michelson interferometers are very sensitive sensors that can be used to detect changes in a physical field such as acoustic pressure or temperature and produce phase signal. The two-arm fiber optic interferometric sensor, such as the Mach-Zehnder interferometer or the Michelson interferometer, uses a distributed feedback (DFB) laser with narrow linewidth (that is, larger coherence length) as the system light source to reduce the phase noise resulting from the optical path difference between the two fiber arms. The Sagnac interferometer uses a superluminescent diode with wide linewidth (that is, smaller coherence length) as the system light source to reduce the Rayleigh scattering noise resulting from the sensing fibers. The laser beam of the light source passing through a leading fiber is split by an optical coupler and transmits into the sensing fibers. When the laser beam passes through the sensing fiber with a length L, the optical phase delay is $\psi=knL$, where k is the optical wavenumber in vacuum, n is the refractive index of the fiber core.

The variation in the optical phase delay of the sensing fiber are caused by the strain and the refractive index change due to acoustic pressure. The two-arm fiber optic interferometric sensor uses the difference variations of the optical phase delay between the two sensing fiber arms, the Sagnac interferometer uses the difference variations of the optical phase delay of the clockwise and the counterclockwise directions of the sensing fiber, both can generate an output intensity containing the sensing phase signal. The output intensity of the interferometric sensor is converted to electrical output signal by an optical receiver.

In the conventional technique, the electrical output signal from the fiber optic interferometric sensor must be demodulated by a demodulation circuit so that sensed phase signal can be linearly demodulated. The most commonly used signal demodulation circuits include the active homodyne with DC phase tracking and the passive homodyne demodulation using phase generated carrier etc. These demodulation circuits of the fiber optic interferometric sensor not only increase the system complexity, but also cause a lot of constraints when operating. For example, some of the demodulations need to add PZT phase modulators to the fiber arms. When the sensing fiber arm has a phase modulator, a driving electrical signal is required. Therefore, the sensing terminal of the optical fiber sensing system can no longer be constructed using all passive elements and the optical fiber sensor can only be used in some specific environments. In addition, the signal demodulation circuits have a dynamic range and frequency band limitations. Therefore, when the sensed phase signal contain the large amplitude and the high frequency, the output signal of the demodulation circuit will encounter the saturation and the distortion.

In some specific applications, the demodulation circuit is only necessary to distinguish whether the sensing signal is large enough. In this situation, there is no need to perform complicated linear signal demodulation. For example, when the fiber optic interferometric sensor is applied to an anti-theft security system, the ability to detect the change in the sensed phase signal caused by an intruder is all that is required. There is no practical need for linearly demodulate the sensed phase signal. Furthermore, the transient sensing phase signal with large amplitude and high frequency is induced by an intrusion, hence, if the foregoing linear demodulation circuit is deployed, saturation or distortion problem will occur more frequently and the complexity of the fiber optic interferometric sensor will increase unnecessarily.

SUMMARY OF THE INVENTION

Accordingly, at least one objective of the present invention is to provide a simple and effective counting signal processing method for a fiber optic interferometer sensor that can be applied to a signal detection system such as an anti-theft system having the fiber optic interferometer sensor serving as a sensor. This counting signal processing technique is possessed of high frequency response and extremely large dynamic range to overcome the drawback of the demodulation circuits.

To achieve these and other advantages and in accordance with the purpose of the invention, as embodied and broadly described herein, the invention provides a counting signal processing method for a fiber optic interferometric sensor. The counting signal processing method is suitable for processing the output intensity from a fiber optic interferometric sensor. The counting signal processing method includes the following steps. First, the output intensity of the fiber optic interferometric sensor is converted into an electric signal having the form $V_0+V_1 \cos \psi(t)$, where $V_0$ is the DC value of the electrical signal, $V_1$ is the amplitude of the electrical signal, and $\psi(t)$ is the sensing phase signal. Then, the number of times N1 that the maximum peak values are greater than a first counting level S1 and the number of times N2 that the minimum peak values are smaller than a second counting level S2 within a specific period of time $T_C$ are counted. Afterwards, when the value of N1, N2 or (N1+N2) is greater than a threshold counting number $C_{th}$, a detectable induced signal occurring in a sensing area is inferred. Then, whether the detectable induced signal is caused by an intruder or otherwise is judged through an alarm identification logic, and an alarm device is triggered to send out an alarm according to the result of the judgment.

In one embodiment of the present invention, the method of converting the output intensity into an electrical signal includes, for example, using an optical receiver to convert the output intensity into an electric signal.

In one embodiment of the present invention, the counting signal processing method for the fiber optic interferometric sensor further includes setting up a system program to automatically detect the maximum and the minimum peak values of the electrical signal after a specific period of time $T_L$. When changes occur in the maximum and the minimum peak values, the counting result of the counting signal processing method provided by the present invention will be affected. Therefore, the system must perform counting level normalization to compensate for such changes so that the counting result will be unaffected.

In one embodiment of the present invention, the method of controlling the alarm device to issue an alarm signal includes triggering the alarm device to emit an alarm signal when the alarm identification logic has determined the detectable induced signal is caused by an intruder.

In one embodiment of the present invention, the method of issuing an alarm signal includes triggering a warning light signal and/or an alarm sound.

In one embodiment of the present invention, the emission of the alarm signal further includes initiating a video recording device and/or a lighting apparatus.

In one embodiment of the present invention, the aforementioned first counting level $S1=(V_0-V_1)+2V_1 \times a\%$ and the second counting level $S2=(V_0-V_1)+2V_1 \times (100-a)\%$ such that $50<a<100$.

In one embodiment of the present invention, the aforementioned first counting level S1 and the second counting level S2 change after a specific period of time $T_L$ according to the changes of the maximum and the minimum peak values.

In one embodiment of the present invention, the method of changing the first counting level S1 and the second counting level S2 includes measuring the maximum peak value $V_{max}$ and the minimum peak value $V_{min}$ within a specific time period $T_L$. Then, the first counting level S1 and the second counting level S2 are renewed according to $V_0=(V_{max}+V_{min})/2$, $V_1=(V_{max}-V_{min})/2$, $S1=(V_0-V_1)+2V_1 \times a\%$ and $S2=(V_0-V_1)+2V_1 \times (100-a)\%$, where $50<a<100$.

In one embodiment of the present invention, the method of measuring the maximum and the minimum peak values of the electrical signal includes measuring within a long specific period of time $T_{LN}$ (here $T_L=T_{LN}$, for example, from several tens of minutes to several hours) the maximum peak value $V_{max}$ and the minimum peak value $V_{min}$ in an electrical signal resulted from environmental fluctuations such as temperature change, acoustic pressure and wind.

In one embodiment of the present invention, the method of measuring the maximum and the minimum peak values of the electrical signal within a specific period of time includes actively performing sinusoidal (for example, 500 to 1000 Hz) current modulation with a burst width $T_B$ (for example, 5 to 10 milliseconds) on the semiconductor laser of the interferometric sensor within a specific period of time $T_{LM}$ (here $T_L=T_{LM}$, for example, 5 to 10 seconds) to generate a phase modulation signal having an amplitude that exceeds $\pi$ rad. Hence, the electrical signal within each sine wave period will ensure to reach the maximum peak value $V_{max}$ and the minimum peak value $V_{min}$, thereby can detect the maximum peak value $V_{max}$ and the minimum peak value $V_{min}$ of the electrical signal within a specific period of time $T_{LM}$.

In one embodiment of the present invention, after measuring the maximum peak value $V_{max}$ and the minimum peak value $V_{min}$ of an electrical signal within a specific time period $T_L$, further includes judging if the working condition of the fiber optic interferometric sensor deteriorates or if it is damaged according to the value of the parameter R, $R=V_{1,n}/V_{1,0}$, where $V_{1,n}$ is the renewed amplitude $V_1$ within the $n^{th}$ time period and $V_{1,0}$ is the original amplitude $V_1$.

In one embodiment of the present invention, after measuring the maximum peak value $V_{max}$ and the minimum peak value $V_{min}$ of an electrical signal within a specific time period, further includes judging if the leading fiber or the sensing fiber of the fiber optic interferometric sensor has been cut off according to the value of the parameter R value within a specific time period $T_L$.

In one embodiment of the present invention, after judging whether the leading fiber or the sensing fiber of the fiber optic interferometric sensor has been cut off, further includes triggering an alarm apparatus to issue a tamper signal according to the result of the judgment.

In one embodiment of the present invention, the method of controlling the alarm apparatus to issue an alarm signal includes: when the $V_1/V_0$ ratio is greater than a specific value, the alarm apparatus is not triggered; when the $V_1/V_0$ ratio is smaller than the specific value, the alarm apparatus is triggered to issue a tamper signal.

The counting signal processing method for a fiber optic interferometric sensor in the present invention performs only counting the numbers of the maximum and minimum of the output intensity from the fiber optic interferometric sensor without carrying out any complicated linear demodulation on the signal. Hence, the method can be applied to detect the signal from an anti-theft system that uses a fiber optic interferometric sensor, and the complexity of the fiber optic interferometric sensor can be reduced. In addition, there is no need to add a phase modulator to the fiber optic interferometric sensor when the counting signal processing method of the present invention is used. Therefore, the sensing terminal of the fiber optic sensing system can be constructed using passive elements entirely. Furthermore, using the counting level normalization technique (that is, changing the first counting level S1 and the second counting level S2 according to the changes of the maximum and minimum peak values within a specific period of time $T_L$), the functional capability of the detection system can be maintained in good performance.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
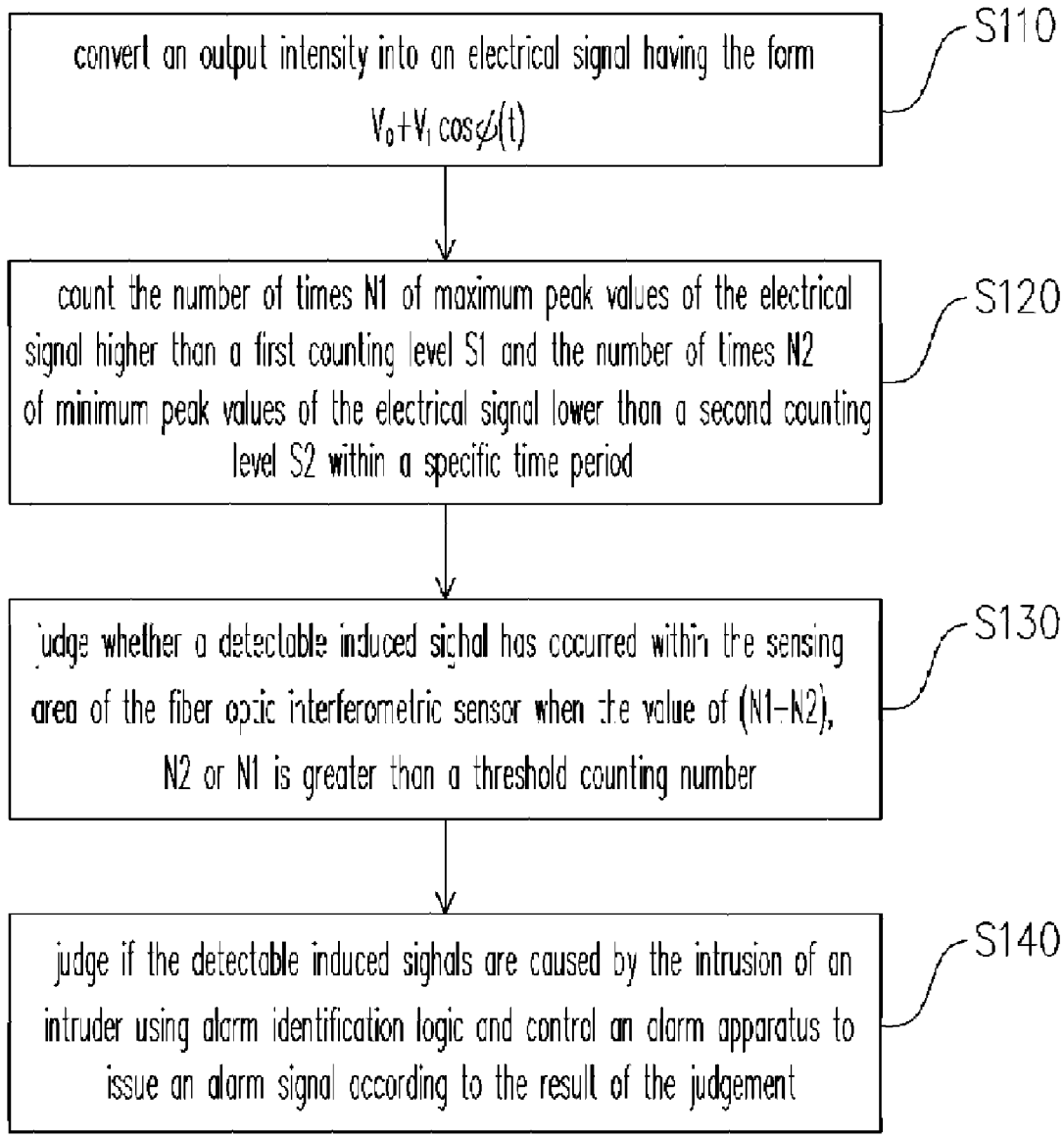
FIG. 1 is a flow diagram showing the steps in a counting signal processing method according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The counting signal processing method for a fiber optic interferometric sensor in the present invention can be applied to detect signals from a fiber optic security system that uses a fiber optic interferometric sensor as a sensing element. With differently single mode fiber cables distributed indoors underneath the floor or outdoors around the fence, walls or underneath the soil, the range of applications is wide. Furthermore, the counting level signal processing method in the present invention may serve as a trigger for an existing anti-theft recording and lighting system and provide a more effective and well-rounded security system. In the following, a more detailed description of the counting signal processing method of the present invention is provided.

Figure 2:
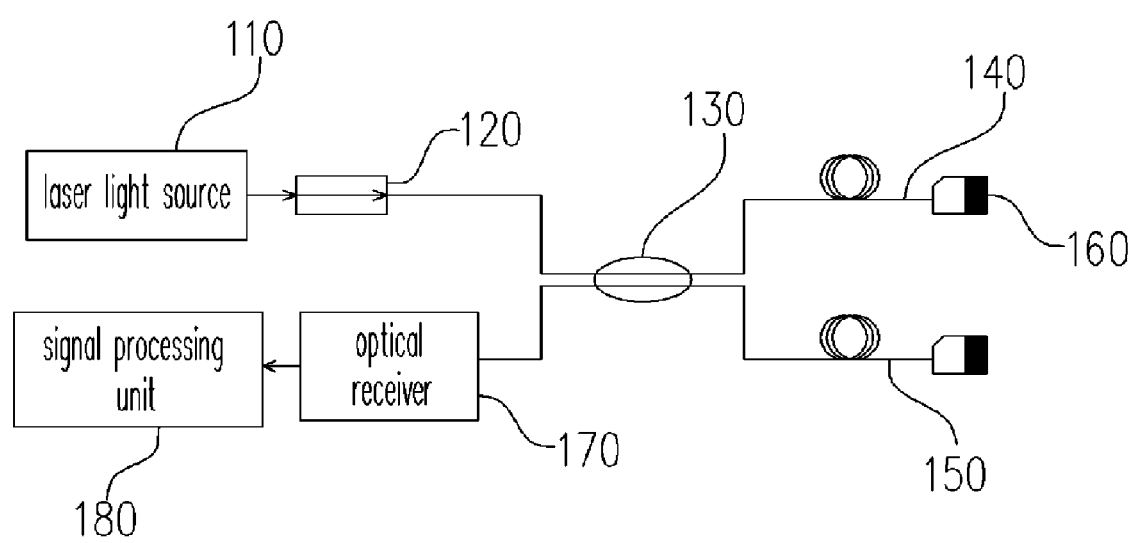
FIG. 2 is a diagram showing the structural layout of the polarization insensitive fiber optic Michelson interferometric sensor (PIFOMIS).

FIG. 1 is a flow diagram showing the steps in a counting signal processing method according to one embodiment of the present invention. FIG. 2 is a diagram showing the structural layout of a fiber optic interferometric sensor. As shown in FIGS. 1 and 2, the counting signal processing method for a fiber optic interferometric sensor in the present embodiment is suitable for processing the output intensity from a fiber optic interferometric sensor 100. The fiber optic interferometric sensor 100 is the sensing element in a fiber optic security system, for example. The fiber optic interferometric sensor 100 shown in FIG. 2 is a polarization insensitive fiber optic Michelson interferometer (PIFOMIS), for example. However, this should by no means limit the scope of the present invention. In other words, the present invention may use a Mach-Zehnder interferometer, a Sagnac interferometer or some other suitable interferometer.

The foregoing fiber optic interferometric sensor 100 comprises a laser light source 110, an optical isolator 120, a fiber coupler 130, a sensing fiber arm 140, a reference fiber arm 150, two Faraday rotating mirrors (FRM) 160 and an optical receiver 170. The laser beam from the laser source 110 passes through the optical isolator 120 to avoid optical feedback, and then the laser beam is split by the fiber coupler 130 into two portions. One portion of the split laser beam will be transmitted to the sensing fiber arm 140 while the other portion of the split laser beam will be transmitted to the reference fiber arm 150. Then, the FRMs 160 attached to the end of the sensing fiber arm 140 and the reference fiber arm 150 will reflect the light to the optical receiver 170. In the present embodiment, the reference fiber arm 150 may also serve as another sensing fiber arm.

When the sensing fiber arm 140 is interacted to an acoustic pressure, the variation in the phase delay of the sensing fiber are caused by the strain and the refractive index change due to acoustic pressure. As a result, there will be some phase delay between the sensing fiber arm 140 and the reference fiber arm 150, and then the fiber optic interferometric sensor 100 generates an output intensity containing the sensed phase signal. In the present embodiment, the counting signal processing method acts according to this output intensity. In the following, the counting signal processing method for the fiber optic interferometric sensor according to the present embodiment is explained in more detail.

The counting signal processing method according to the present embodiment includes the following steps. First, as shown in step S110 (FIG. 1), the output intensity produced by the fiber optic interferometric sensor 100 is converted into an electrical signal $V_0+V_1 \cos \psi(t)$, where $V_0$ is the DC value of the electrical signal and $V_1$ is the amplitude of the electrical signal such that $V_0 \geq V_1$. Then, a signal processing unit 180 processes the electrical signal. In the present embodiment, the output intensity is converted to an electrical signal having the form $V_0+V_1 \cos \psi(t)$ through the optical receiver 170.

Then, in step S120, the number of times N1 that the maximum peak values of the electrical signal are higher than a first counting level S1 and the number of times N2 that the minimum peak values of the electrical signal are lower than a second counting level S2 within a specific time period $T_C$ are counted. In other words, the present embodiment can compute the values of N1, N2 or N1+N2. Moreover, because sensed phase signal $\psi(t)$ will change with time, $\cos \psi(t)$ will reach the maximum/minimum peak value of ±1 when the instant values of $\psi(t)$ are equal to $m\pi$ (where m is an integer). Hence, the sensed phase signal $\psi(t)$ contains the large amplitude and the high frequency, the larger will be the number of times reaching the maximum/minimum peak values of ±1 within a specific time period $T_C$.

In order to stably obtain the number of times N1 and the number of times N2, a proper counting level must first be set. If the counting levels deviate substantially from the maximum and minimum, then some peaks of the output signal between maximum and minimum will be incorrectly counted. On the contrary, if the counting levels are too close to the maximum and minimum, some noise with high frequency but small amplitude around the maximum and minimum will be counted so that the signal-to-noise ratio will be lowered. In the present embodiment, the first counting level S1 and the second counting level S2 are taken to be a % and (100−a) % of the peak-to-peak sensed signal, where 50<a<100. For example, 'a' can be taken properly to be around 90%. In addition, the first counting level S1= $(V_0-V_1)+2V_1 \times$ a % and the second counting level S2= $(V_0-V_1)+2V_1(100-a)$ %.

The counting signal processing method in the present embodiment will obtain a count values within per specific time period $T_C$ consecutively. The count (that is, N1, N2 or N1+N2) of this maximum and/or minimum peak values can serve as a base for distinguishing characteristics of the magnitude and frequency of the sensing phase signal $\psi(t)$. It should be noted that the counting signal processing method in the present embodiment further includes automatically detecting the maximum and the minimum peak values of the electrical signal within a specific time period $T_L$. When the maximum and the minimum peak values change, a counting level normalization is automatically performed so that the ultimate counting result will be unaffected.

In step S130, when the value of (N1+N2), N2 or N1 is greater than a threshold counting number $C_{th}$, a detectable induced signal occurring within the sensing area of the fiber optic interferometric sensor is inferred. To reduce the probability of a false alarm, the signal processing software may set up a few important parameters. These parameters include the threshold counting number $C_{th}$ and the threshold number $N_s$ of the detectable induced signals per specific time period $T_D$. More specifically, a typical counting number in the presence of an intruder can be found through experiments and used as a reference for the selection of a threshold counting number $C_{th}$. When the value of N1, N2 or (N1+N2) is greater than the threshold counting number $C_{th}$, a detectable induced signal is judged being occurred in the sensing area of the fiber optic interferometric sensor 100. The detectable induced signal can be induced by environmental noise or by some events which includes an intruder, a thunder, a spell of high wind or the passage of a heavily loaded vehicle.

Then, in step S140, alarm identification logic is used to judge whether an intruder causes the detectable induced signal. According to that judgment, an alarm apparatus is triggered to emit an alarm signal. More specifically, if the fiber optic interferometric sensor 100 is laid underneath and the inductive width of the sensing fiber area can reach up to 1.5 m, an intruder passing through the sensing area will trigger the sensor at least twice. In other words, the threshold number $N_s$ can be set to two or more. Thus, the single detectable induced signal within a specific time period $T_D$ caused by a sudden event (such as thunder, wind, and vehicle) or environmental noise will not lead to a false alarm. On the other hand, if the number of the detectable induced signal within a specific time period $T_D$ is larger than the $N_s$, the alarm identification logic will judge the occurrence as an intrusion and will trigger the alarm apparatus to produce an alarm signal that warns the user or scares off the intruder. The alarm signal is an alarm light and/or an alarm sound, for example. In one preferred embodiment, the alarm signal will also trigger a video recording device to capture an image of the intruder so that the security system is more effective and powerful.

Figure 3:
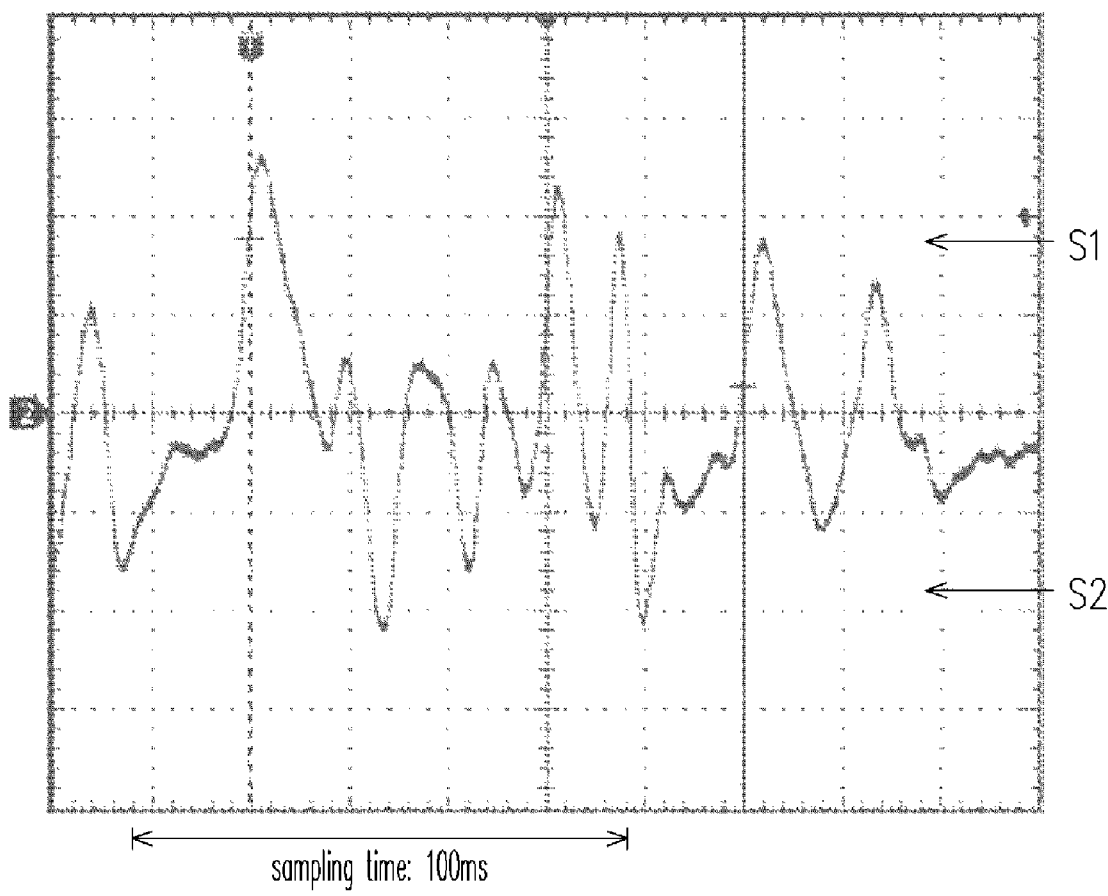
FIG. 3 is a graph showing the output intensity waveform of the PIFOMIS sampled randomly under normal environment, the PIFOMIS fiber arms are buried underneath 10 cm of soil.
Figure 4:
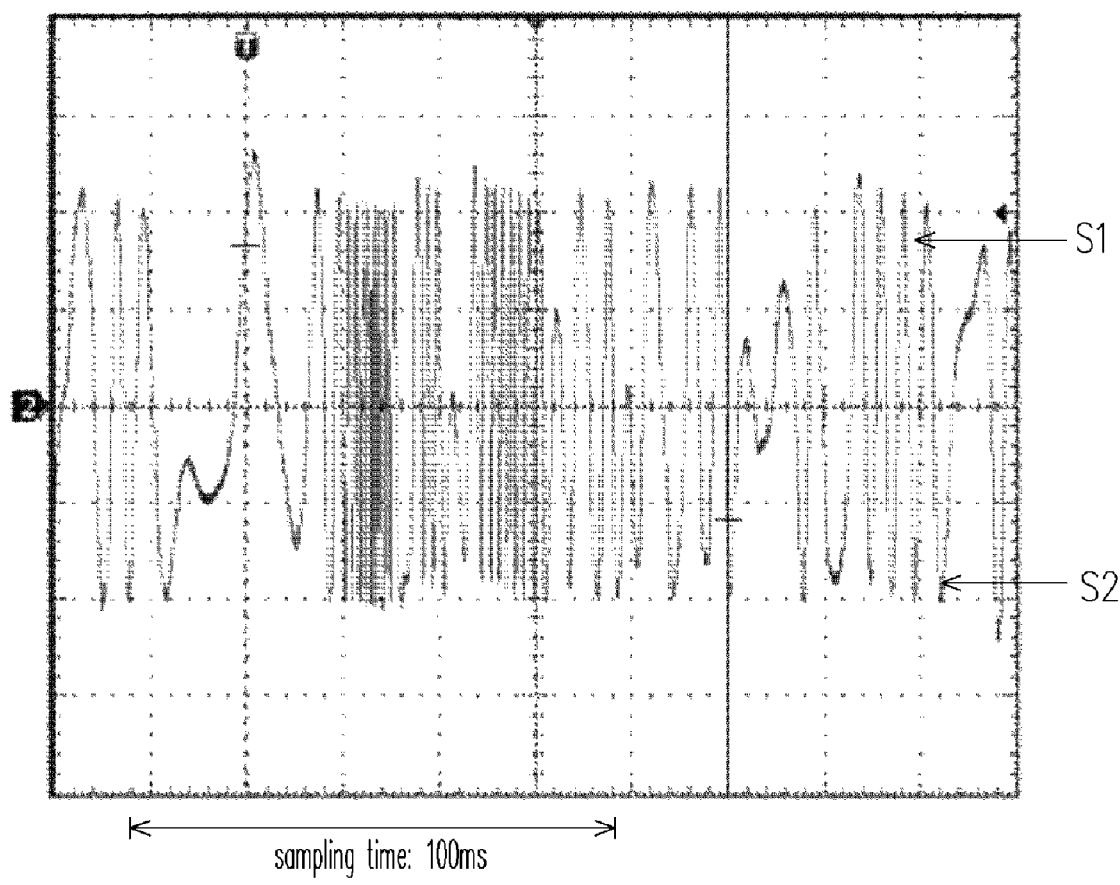
FIGS. 4 and 5 are graphs showing the output intensity waveform of the PIFOMIS obtained when a person with a weight of about 60 kg walking at a speed of 1 m/s and 2 m/s over the sensor, the PIFOMIS fiber arms are buried underneath 10 cm of soil.
Figure 5:
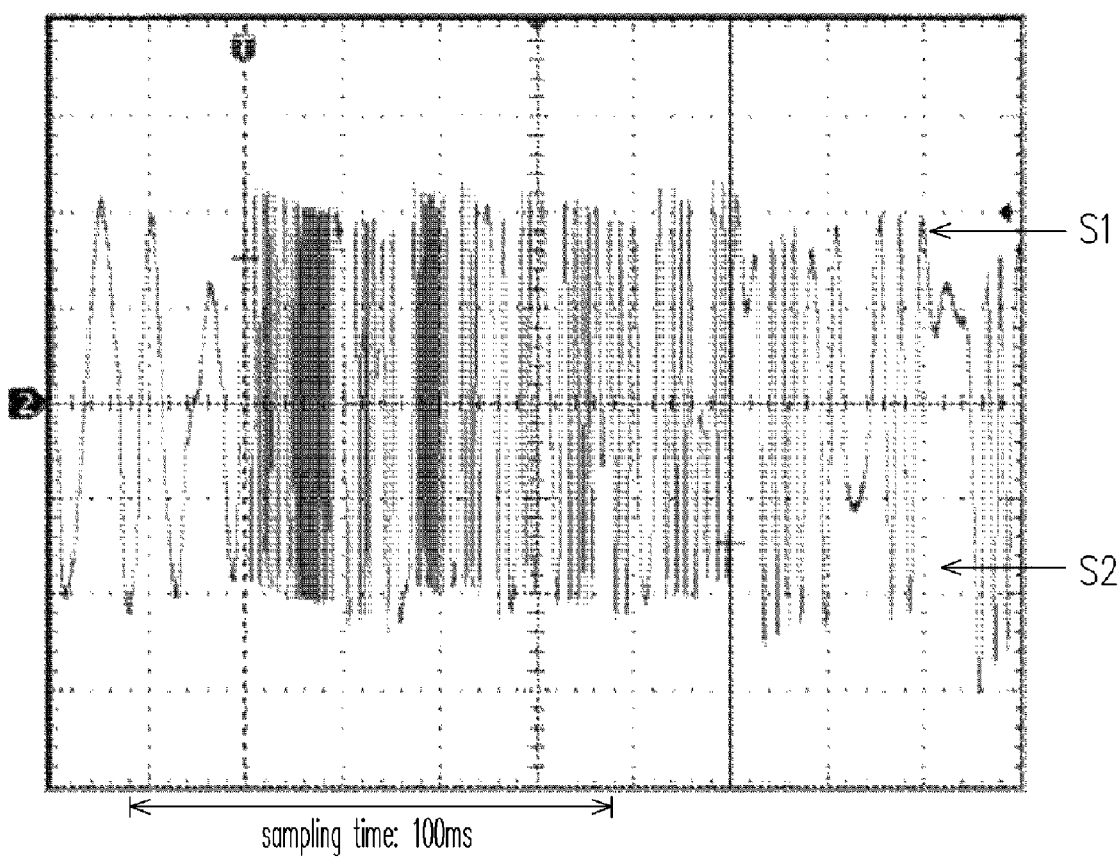

FIG. 3 is a graph showing the interference signal waveform of the PIFOMIS under normal environment, the fiber arms with 1.2 mm diameter PE jacket are buried underneath 10 cm of soil, the lengths of the fiber arms are approximated 40 m. FIGS. 4 and 5 are graphs showing the interference signal waveforms obtained when a person with a weight of about 60 kg walking at a speed of 1 m/s and 2 m/s over the sensing area of the PIFOMIS, the installed condition is identical to FIG. 3. As shown in FIGS. 3, 4 and 5, the horizontal axis is the time with each division representing 20 ms. When the sampling time is 100 ms (as indicated in the figures), the counting values of (N1+N2) are 4, 46 and 106 respectively. According to the testing result in FIGS. 3, 4 and 5, the counting values of (N1+N2) of the interference signal waveform in the presence of an intruder is significantly larger than the one caused by environmental noise. Therefore, the counting signal processing method for the fiber optic interferometric sensor in the present embodiment can provide a very effective means of detecting the sensing signal induced by an intruder.

Figure 6:
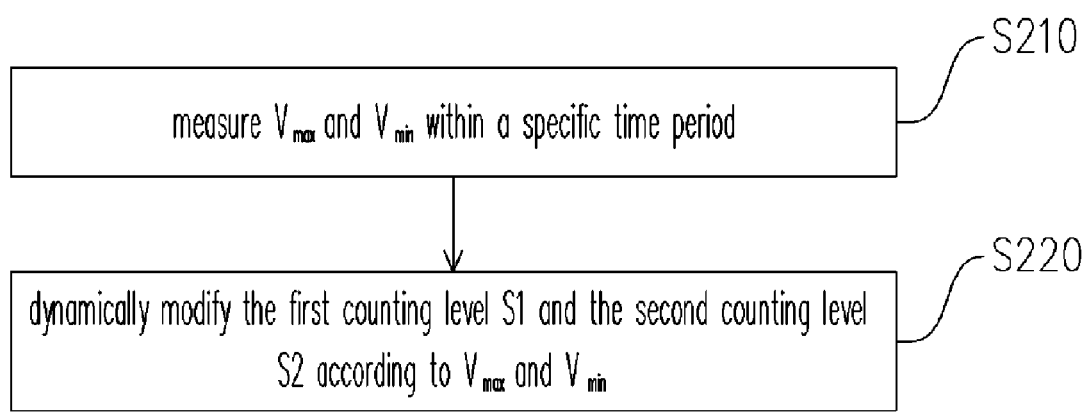
FIG. 6 is a flow diagram showing the steps for performing a counting level normalization according to one embodiment of the present invention.

FIG. 6 is a flow diagram showing the steps for performing a counting level normalization according to one embodiment of the present invention. In general, the amplitude of the output intensity of the fiber optic interferometric sensor 100 will drop along with the change in some factors such as the aging of some optical components or the change in the layout environment. Accordingly, the maximum/minimum peak values of the sensor output signal will also change, the count of the counting signal processing techniques will be affected. Therefore, it is necessary the counting level normalization technique to compensate the output intensity attenuation so the count will not be affected. In other words, the aforementioned first counting level S1 and the second counting level S2 will be dynamically modified after a specific time period $T_L$ according to the changes of the maximum and the minimum peak values of the electrical signal. In the following, two methods for modifying the first counting level S1 and the second counting level S2 are described.

In the first method, the output signal from the fiber optic interferometric sensor 100 is in the form $V_0+V_1 \cos \psi(t)$. In the absence of an intruder, environmental noise (such as temperature change or some low frequency vibrations) will produce a low frequency phase signal $\psi n(t)$ which resemble the interference signal waveform of FIG. 3. After waiting for a sufficiently long period $T_{LN}$ (for example, from several tens of minutes to several hours), the environmental noise will enable $\psi_n(t)$ to produce a sufficient sensing phase signal (that is, the phase signal change greater than $2\pi$) for cos $\psi_n(t)$ to reach the maximum/minimum peak value of ±1. Hence, the method of modified the first counting level S1 and the second counting level S2 includes measuring the maximum peak value $V_{max}$ and the minimum peak value $V_{min}$ within a specific time period $T_{LN}$ due to environmental noise (as in step S210). After that, the first counting level S1 and the second counting level S2 are renewed (as in step S220) according to $V_0=(V_{max}+V_{min})/2$, $V_1=(V_{max}-V_{min})/2$, $S1=(V_0-V_1)+2V_1\times a$ % and $S2=(V_0-V_1)+2V_1\times(100-a)$ %, where $50<a<100$.

In the second method, that is a fast method to obtain the maximum peak value $V_{max}$ and the minimum peak value $V_{min}$ in a two-arm fiber optic interferometric sensor, the length of the two fiber sensing arms are designed to have a fixed difference (for example, 2~10 cm). Moreover, a distributed feedback laser with narrow linewidth is used as the light source, by applying a burst sinusoidal modulation, $\Delta i \sin \omega_m t$ (typically, the burst width $T_B$ is 10 ms and $f_m=\omega_m/2\pi=1$ kHz), to the injection current of the DFB laser for producing a phase modulated signal. In this way, the output intensity received by the optical receiver 170 has the form $V_0+V_1 \cos[\psi(t)+\psi_m \cos \omega_m t]$ with $\psi_m \cos \omega_m t$ as the phase-modulated signal. If the burst sinusoidal modulation current is sufficiently big so that the amplitude of the generated modulated signal $\psi_m \geq \pi$ rad, $V_{max}$ and $V_{min}$ will appear in the output intensity $V_0+V_1 \cos[\psi(t)+\psi_m \cos \omega_m t]$ within one cycle period $T_m(T_m=2\pi/\omega m)$. In an actual system, a burst sinusoidal modulation of the laser can be carried out continuously after a suitable time period $T_{LM}$ (for example, several seconds to tens of seconds). Meanwhile, the two-arm fiber optic interferometric sensor can measure the maximum peak value $V_{max}$ and the minimum peak value $V_{min}$ of the sensed signal within a time period $T_{LM}$ (as in step S210). In this way, the renewal of the maximum peak value $V_{max}$ and the minimum peak value $V_{min}$ of the sensed signal after time period $T_{LM}$ in the two-arm fiber optic interferometric sensor is ensured. Then, the first counting level S1 and the second counting level S2 are renewed according to $V_0=(V_{max}+V_{min})/2$, $V_1=(V_{max}-V_{min})/2$, $S1=(V_0-V_1)+2V_1 \times a$ % and $S2=(V_0-V_1)+2V_1\times(100-a)$ %, where $50<a<100$ (for example, in step S220).

In addition, the maximum/minimum peak value $V_{max}$ and $V_{min}$ of the sensed signal can serve as a system monitored for the whole fiber optic interferometric sensor 100. More specifically, at the start of using the fiber optic interferometric sensor, the maximum/minimum peak value $V_{max}$ and $V_{min}$ within a specific time period $T_L$ can be measured and the data stored. Then, according to the value of the parameter R, $R=V_{1,n}/V_{1,0}$, whether the fiber optic interferometric sensor 100 is normal or abnormal can be determined. Here, $V_{1,n}$ is the renewed amplitude $V_1$ within the $n^{th}$ time period and $V_{1,0}$ is the original amplitude $V_1$.

In general, $R \leq 1$. When the value of R drops to a specific value (for example, 0.5), a problem somewhere along the optical path (for example, the laser light source 110, the fiber sensing arm 140, the reference fiber arm 150, the leading fiber or the optical receiver 170) is inferred. Therefore, the alarm apparatus is controlled to issue a tamper signal so that the user of the security system knows there is a need to perform further testing or repair for bringing the whole security system back to good functional condition. It should be noted that the security system could still operate normally (that is, the counting level normalization technique still maintains a normal operation) although the alarm apparatus has issued a tamper signal. Unless the value of R drops to a really low value to cause the counting level normalization function is abnormal, the security system will not shut down prematurely.

In one embodiment, if the security system has a number of sensors all using the same laser as the light source and the value of R in these sensors drop consistently after the security system has operated for a period of time, aging of the laser is judged. However, if the value of R in a particular sensor drops while the value of R in the other sensors remain the same, the root cause is judged to be in the fiber optic interferometric arm, the leading fiber or the optical receiver of the sensor as a result of the aging or damaging of a particular element. Investigating the fringe visibility of the output intensity of the sensor can identify the exact cause of the problem.

The foregoing fringe visibility of the output intensity is given by the relation $VIS=(V_{max}-V_{min})/(V_{max}+V_{min})=V_1/V_0$. Hence, using the maximum/minimum peak values $V_{max}$ and $V_{min}$ data, the value of VIS can be computed. Assume the initial fringe visibility of the output intensity in the fiber optic interferometric sensor is $VIS_{ori}$. After a specific time period $T_L$, the system will perform a new measurement to find a new fringe visibility $VIS_{new}$. Furthermore, define a relative fringe visibility as $VIS_{rel}=VIS_{new}/VIS_{ori}$. If R<<1 and the relative fringe visibility $VIS_{rel}$~1 of the sensor, the cause is judged to be the leading fiber or the optical receiver 170. However, if R<<1 and $VIS_{rel}$<<1, the cause is judged to be the fiber arms of the interferometric sensor.

In one embodiment of the present invention, after measuring the maximum peak value $V_{max}$ and the minimum peak value $V_{min}$ of the sensed signal within a specific time period $T_L$, the VIS is calculated and used to determine whether the reference fiber arm 150 or the sensing fiber arm 140 of the fiber optic interferometric sensor 100 is cut off or not. More specifically, the value of VIS drops to zero instantly no matter if the reference fiber arm 150 or the sensing fiber arm 140 of the fiber optic interferometric sensor 100 is cut off. When the value of VIS drops to zero, the alarm apparatus of the security system will be triggered to issue a tamper signal.

In summary, the counting signal processing method in the present invention has at least the following advantages:

1. Since the counting signal processing method performs only counting the numbers of the maximum and minimum of the output intensity of a fiber optic interferometric sensor, there is no need to perform sophisticated linear demodulation of the signal. Hence, the method can be applied to detect signals in a security system having a simplified fiber optic interferometric sensor.

2. The counting rate in the counting signal processing method of the present invention is much higher than the frequency of appearance of the actual peak value in the output intensity. Hence, there is no restraint to the dynamic range of the sensed phase signal, and thus the problem of saturation or distortion is avoided.

3. Through the counting level normalization technique, the security system is effectively and consistently maintained.

4. The fringe visibility of the output intensity can be used to judge if the fiber optic interferometric sensor is damaged so that a tamper signal can be issued whenever the sensor is at fault.

5. The counting signal processing method in the present invention does not need to incorporate a phase modulator in the fiber optic interferometric sensor. Therefore, the sensing terminal of the fiber optic sensing system is able to meet the demand of using passive elements exclusively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A counting signal processing method for a fiber optic interferometric sensor suitable for processing an output intensity of a fiber optic interferometric sensor, the counting signal processing method comprising the steps of:

converting the output intensity into an electrical signal having the form $V_0+V_1 \cos \psi(t)$, wherein $V_0$ is the DC value of the electrical signal and $V_1$ is the amplitude of the electrical signal;

counting the number of times N1 of maximum peak values higher than a first counting level S1 and the number of times N2 of minimum peak values lower than a second counting level S2 within a specific time period $T_C$;

when the value of (N1+N2), N2 or N1 is greater than a threshold counting number $C_{th}$, judging a detectable induced signal has occurred within a sensing area of the fiber optic interferometric sensor; and judging if the detectable induced signals are caused by an intruder using an alarm identification logic and controlling an alarm apparatus to issue an alarm signal according to result of the judgment.

2. The counting signal processing method of claim 1, wherein the step of converting the output intensity into an electric signal includes using an optical receiver to convert the output intensity into an electrical signal.

3. The counting signal processing method of claim 2, wherein the processing method further includes automatically detecting the maximum and the minimum peak values within a specific time period $T_L$ and performing a compensation treatment involving a counting level normalization whenever a change in the maximum and the minimum peak values has occurred so that the counting result remains unaffected.

4. The counting signal processing method of claim 1, wherein the step of controlling the alarm apparatus to issue an alarm signal includes issuing an alarm signal when the alarm identification logic judges that the detectable induced signals are an event triggered by intrusion of an intruder.

5. The counting signal processing method of claim 1, wherein the step of issuing an alarm signal includes emitting an alarm light signal and/or an alarm sound.

6. The counting signal processing method of claim 1, wherein the step of issuing an alarm signal further includes triggering a video recording device and/or a lighting apparatus.

7. The counting signal processing method of claim 1, wherein the first counting level $S1=(V_0-V_1)+2V_1\times a$ % and the second counting level $S2=(V_0-V_1)+2V_1\times(100-a)$ %, and 50<a<100.

8. The counting signal processing method of claim 1, wherein the first counting level S1 and the second counting level S2 change after a specific time period $T_L$ according to changes of the maximum and the minimum peak values.

9. The counting signal processing method of claim 8, wherein the step of changing the first counting level S1 and the second counting level S2 includes:

measuring the maximum peak value $V_{max}$ and the minimum peak value $V_{min}$ of the electrical signal within a specific time period $T_L$; and renewing the first counting level S1 and the second counting level S2 according to $V_0=(V_{max}+V_{min})/2$, $V_1=(V_{max}-V_{min})/2$, $S1=(V_0-V_1)+2V_1 \times a$ % and $S2=(V_0-V_1)+2V_1 \times (100-a)$ %, where $50 < a < 100$.

10. The counting signal processing method of claim 9, wherein the step of measuring the maximum peak value $V_{max}$ and the minimum peak value $V_{min}$ of the electrical signal within a specific time period $T_L$ includes measuring the maximum peak value $V_{max}$ and the minimum peak value $V_{min}$ of the electrical signal within a specific time period $T_L$ due to environmental factors such as temperature variation, acoustic pressure and wind.

11. The counting signal processing method of claim 9, wherein the step of measuring the maximum peak value $V_{max}$ and the minimum peak value $V_{min}$ of the electrical signal within a specific time period $T_L$ includes performing a sinusoidal current modulation with a burst width $T_B$ on the semiconductor laser of the fiber optic interferometric sensor within a specific time period $T_L$ to generate a phase modulated signal having an amplitude exceeding $\pi$ rad so that the electrical signal within each sine wave period reaches the maximum peak value $V_{max}$ and the minimum peak value $V_{min}$ for measuring the maximum peak value $V_{max}$ and the minimum peak value $V_{min}$ of the electrical signal within each specific time period $T_L$.

12. The counting signal processing method of claim 9, wherein after measuring the maximum peak value $V_{max}$ and the minimum peak value $V_{min}$ of the electrical signal within a specific time period $T_L$, further includes judging if the fiber optic interferometric sensor has deteriorated or damaged according to the value of the parameter R, $R=V_{1,n}/V_{1,0}$, where $V_{1,n}$ is the renewed amplitude $V_1$ within the $n^{th}$ time period and $V_{1,0}$ is the original amplitude $V_1$.

13. The counting signal processing method of claim 12, wherein after measuring the maximum peak value $V_{max}$ and the minimum peak value $V_{min}$ of the electrical signal within a specific time period $T_L$, further includes judging whether the leading fiber or the fiber arms of the fiber optic interferometric sensor have been cut off according to the value of the parameter R within a specific time period $T_L$.

14. The counting signal processing method of claim 13, wherein after judging if the leading fiber or the fiber arms of the fiber optic interferometric sensor have been cut off, further includes controlling the alarm apparatus to issue a tamper signal according to the result of the judgment.

15. The counting signal processing method of claim 14, wherein the step of controlling the alarm apparatus includes not triggering the alarm apparatus when the value of the parameter R is larger than a specific value and triggering the alarm apparatus to issue the tamper signal when the value of the parameter R is smaller than the specific value.

* * * * *